C. F. COX.
MACHINE FOR MAKING GLASS BOTTLES.
APPLICATION FILED JUNE 4, 1912.

1,385,428.

Patented July 26, 1921.
10 SHEETS—SHEET 1.

WITNESSES

INVENTOR
CHARLES F. COX
BY
ATTORNEYS

C. F. COX.
MACHINE FOR MAKING GLASS BOTTLES.
APPLICATION FILED JUNE 4, 1912.

1,385,428.

Patented July 26, 1921.
10 SHEETS—SHEET 2.

WITNESSES

INVENTOR
CHARLES F. COX
BY
ATTORNEYS

C. F. COX.
MACHINE FOR MAKING GLASS BOTTLES.
APPLICATION FILED JUNE 4, 1912.

1,385,428.

Patented July 26, 1921.
10 SHEETS—SHEET 5.

WITNESSES

INVENTOR
CHARLES F. COX
BY
ATTORNEYS

C. F. COX.
MACHINE FOR MAKING GLASS BOTTLES.
APPLICATION FILED JUNE 4, 1912.

1,385,428.

Patented July 26, 1921
10 SHEETS—SHEET 6.

WITNESSES

INVENTOR
CHARLES F. COX
BY
ATTORNEYS

C. F. COX.
MACHINE FOR MAKING GLASS BOTTLES.
APPLICATION FILED JUNE 4, 1912.

1,385,428.

Patented July 26, 1921.
10 SHEETS—SHEET 7.

WITNESSES
G. V. Rasmussen
Emm Shilgoung INVENTOR
CHARLES F. COX
BY
Onesen H Krauth
ATTORNEYS

C. F. COX.
MACHINE FOR MAKING GLASS BOTTLES.
APPLICATION FILED JUNE 4, 1912.

1,385,428.

Patented July 26, 1921.
10 SHEETS—SHEET 8.

WITNESSES

INVENTOR
CHARLES F. COX
BY
ATTORNEYS

C. F. COX.
MACHINE FOR MAKING GLASS BOTTLES.
APPLICATION FILED JUNE 4, 1912.

1,385,428.

Patented July 26, 1921.
10 SHEETS—SHEET 9.

WITNESSES
G. V. Rasmussen

INVENTOR
CHARLES F. COX
BY
ATTORNEYS

UNITED STATES PATENT OFFICE.

CHARLES F. COX, OF BRIDGETON, NEW JERSEY.

MACHINE FOR MAKING GLASS BOTTLES.

1,385,428.   Specification of Letters Patent.   Patented July 26, 1921.

Application filed June 4, 1912. Serial No. 701,506.

*To all whom it may concern:*

Be it known that I, CHARLES F. Cox, a citizen of the United States, and a resident of Bridgeton, county of Cumberland, and State of New Jersey, have invented certain new and useful Improvements in Machines for Making Glass Bottles, of which the following is a specification.

My invention relates to a machine for making glass bottles of any desired form or size and to certain novel mechanical combinations in such a machine whereby are accomplished certain novel modes of operation. More particularly my invention relates to mechanical combinations in a machine as aforesaid such that the machine will operate in a substantially automatic and continuous manner in carrying out all the various detailed operations necessary to the production of a finished bottle and so as to require substantially no attendance other than that required to supply the machine with molten glass, to start the machine, and to remove the finished bottle.

The object of my invention is to provide a machine of the character described which shall be comparatively simple in its construction, thus being little liable to get out of order, and positive and certain in its operation. A further object of my invention is to provide such a machine which shall work quickly and, therefore, have a large capacity. A still further and most important object of my invention is to provide a machine which shall be substantially automatic in its operation, so that but little attendance is required and that not of a skilled character, while, at the same time, the product turned out by the machine is uniform and accurate. Other objects of my invention will appear as the specification proceeds.

Brief description of the machine.

A brief general description of a preferred form of my invention and its mode of operation, will, perhaps be helpful and conducive to a clearer understanding of the more detailed description which follows later.

Briefly considered, therefore, the machine of my invention comprises a main stationary frame provided with a hollow central pillar; upon this frame, mounted so as to revolve about the pillar, is a table upon which are carried, spaced 90° apart, four sets of bottle molds. Each set of molds comprises a neck mold, a blank mold, and a blow mold; the neck mold and blank mold are both fixed to a support which is adapted to be rotated about a horizontal axis extending radially from the pillar, while the blow mold is carried upon a support fixed to the table at a point radially outside the other two molds.

Attached, vertically in line with one another, to the main frame, is an upper, downwardly movable, finishing plunger for the bottom of the blank; a lower, upwardly movable, plunger for the neck of the blank; and a funnel into which the molten glass, from which a bottle is to be produced, is inserted.

The table, with the attached sets of molds, is caused to be revolved by steps of 90°, means being provided for locking the table against further revolution after each 90° step. The position of rest for the table is so chosen that a set of molds as above, the two plungers and the funnel, are always in a given radial plane.

All the molds of each set are sectional or split, the parts of each mold being arranged to be laterally opened from or closed upon one another. For a given set of molds the blow mold and the blank mold when closed have the same central axis but these molds are so arranged that the blow mold must always be open when the blank mold is closed, while when the blank mold is open the blow mold may be closed.

The table is rotated, the molds opened and closed and rotated, the plungers operated and all the other incidental mechanical operations later to be described are primarily effected, by the use of compressed air. Pipes for carrying the air to the various parts of the machine, valves for affording the air an opportunity to actuate the various parts and for controlling the sequence in which the various operations must be performed, and intermediate mechanisms through which the air is caused to operate the various parts of the machine, are suitably attached to the frame of the machine and to the table. In passing from the upper side of the table to the lower side thereof I prefer to carry any necessary pipes through the hollow central pillar above referred to.

The set of molds which, at any particular time, rests in the radial plane of the funnel and plungers may be said to be at the first or filling station. At this station the neck mold and the blank mold are both closed and, taken as one mold, are inverted.

In operation, molten glass is inserted into the funnel and, passing into the large end of the blank mold, fills both the blank and neck molds. Generally, although not necessarily, suction is now applied at the neck mold to completely fill the same with the molten glass. The operator then depresses an adjacent tripping lever which permits the air to become effective. The following operations are then automatically performed in proper sequence; shears close just above the blank mold, cutting off any excess of glass, and immediately reopen, upon which the upper plunger comes down upon the glass, pressing it down into the mold and being simultaneously rotated so as to give a finish to the bottom of the blank. Simultaneously the lower plunger, carrying the neck finishing head which enters the neck mold, is rotated so as to form and finish the interior of the neck. The plungers are then both withdrawn and, at the same time, the table is unlocked and then rotated. As the table rotates the neck and blank molds are rotated vertically so that when they arrive at the end of the 90° step or at the second station, the bottle blank is upright. The blank mold is then opened away from the blank and from the neck mold, from which the blank is now suspended, and the blow mold closed around the blank and upon the neck mold. As soon as the blow mold is closed, air is supplied to the neck portion of the blank, as a result of which the blank is then blown out to fill the blow mold.

While these operations have been going on at the second station the operator, who remains at the first station, has filled the blank and neck mold of the set which, by the revolution of the table, has reached said first station. When he depresses the tripping lever for this second set of molds the table will again be revolved through 90° and the first set of molds will move from the second to the third station. At this third station the neck mold is opened. After a third set of molds has been filled by the operator, the table is again revolved and the first set of molds reaches the fourth station, where the blow mold is opened, when the finished bottle may be removed. After the fourth set of molds has been filled, the first set will be brought back to the first station by the rotation of the table, and the neck and blank molds will be again closed and inverted so as to be ready for another filling of molten glass.

It will be thus seen that, in the normal use of my machine, there are always four bottles in the machine, at one time, in different stages of manufacture and that complete bottles are produced without requiring anything of the operator except the filling of the molds as they successively stop at the first station, the depressing of the tripping lever, and the removal of the completed product.

I have described my machine as having four sets of molds. I may, however, without departing from the spirit of my invention, use an increased number of sets of molds. The rate of production of a given machine would not be thereby increased but the time during which each individual bottle is subjected to the manufacturing process would be lengthened.

*Brief description of the drawings.*

Referring now to the drawings which embody a preferred form of my invention, Fig. 36 represents an enlarged axial section, part elevation, through a bottom control valve which controls the lower plunger.

*Detailed description of the machine.*

Figure 12:
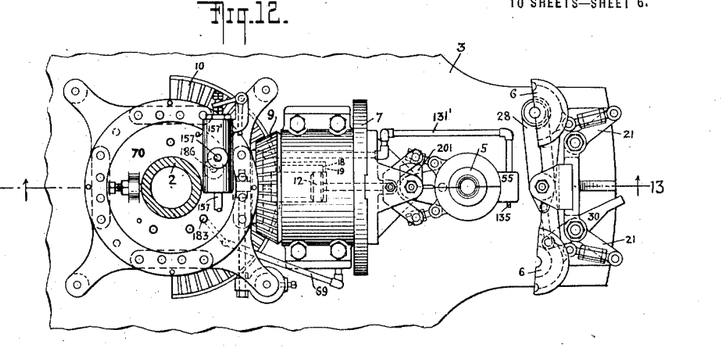
Fig. 12 represents a top plan, part section, of a portion of the table as it appears at the first station with molds ready for a charge of glass; this same view appears as part of Fig. 3, but on a smaller scale.
Figure 13:
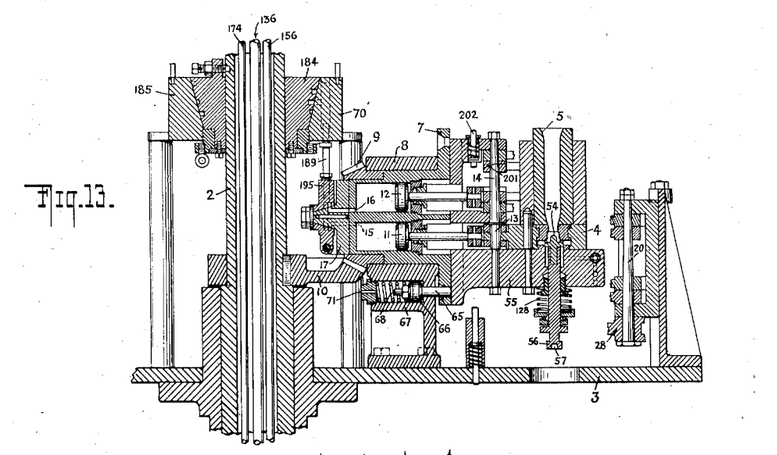
Fig. 13 represents a sectional elevation taken along the line 13—13, Fig. 12 and shows the mechanism for opening and closing the blank molds.
Figure 16:
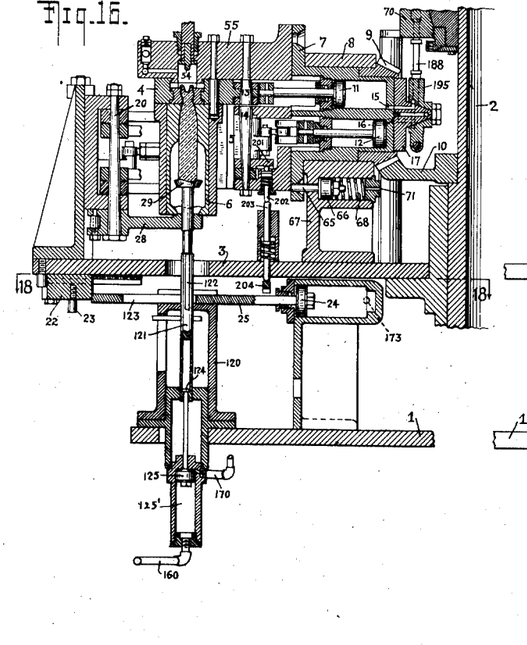
Fig. 16 represents a sectional elevation, to the same scale as Fig. 13, taken along the line 16—16 of Fig. 3, and shows some of the mechanism for opening and closing the blow molds.
Figure 17:
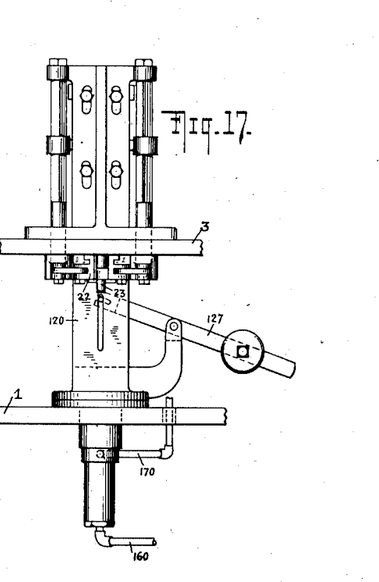
Fig. 17 represents an end elevation of the structure shown in Fig. 16 taken from the left.

In the drawings a main stationary frame comprises a lower platform 1 provided with an upstanding hollow pillar 2; the platform is mounted upon wheels so that the machine may be easily moved from place to place, as *e. g.*, from one furnace to another, or for repairs. Mounted above the platform, and adapted to be revolved about the pillar, is a table 3 upon which are carried, spaced 90° apart, four sets of bottle molds; each set of said molds comprises a split or bipartite neck mold 4, a split blank mold 5, and a split blow mold 6. The neck mold and blank mold are both fixed to a plate 7 at the end of a hollow drum 8 which drum, by reason of a gear 9 meshing with a segmental gear 10 fixed to the stationary frame of the machine, is adapted to be revolved about a radial horizontal axis as the table is revolved about the pillar; the neck mold and blank mold are respectively provided with toggles and pistons 11, 12, the latter working in appropriate cylinders, by means of which said molds may be independently opened and closed about the two alined axes, 13, 14. Openings 15, 16 (Fig. 13) lead respectively from the rear of the two cylinders through a vertical revolving valve 17, later to be described, and passages 18, 19 (Fig. 12) lead from the front of said cylinders to and through said valve. The blow mold 6, which, as stated previously, is supported directly from the table, is adapted to be opened and closed about an axis 20 by means of rock shafts 21 which extend through and below the table, one for each section of the mold, one arm fixed to said shaft being joined by a link to the mold section and the other arm, which lies below the table, being attached to a slide 22 carrying a pin 23; at the second station, which this mold reaches while open, piston 24 (Figs. 16, 18) will be moved to the left and through plate 25, carried by said piston, push slide 22 to the left so as to close the mold which will remain closed until, by the revolution of the table, it reaches the fourth station, where piston 26 (Fig. 20) will be moved to the left, thus engaging button 27 with pin 23 and thereby opening the mold.

Swung upon the axis 20, below the blow mold, is an arm 28 one end of which slidably supports a spindle to the top of which is fixed the mold bottom 29. A pivoted lever 30, joined by a link to the other end of said arm, projects over the edge of the table and is adapted, just as the table is about to leave the fourth station, to engage a fixed arm 31 which projects up from below the table so as to throw the mold bottom aside from bottle blowing to inoperative position. Since, however, even in its lowest position, the mold bottom will never be below the bottom of the blow mold proper, it follows that the mold bottom will always be swung back again into blowing position when the blow mold is closed.

An overhanging arm 32, clamped to the top of the hollow pillar, carries a cylinder provided with a downwardly movable plunger 33 the bottom of which is tipped with a bottom finishing head 34; attached to the bottom of the cylinder is a casing 35 containing two cylinders in one of which is a double pistoned spindle constituting a principal air valve 36 while the other cylinder is provided with a piston 37 fixed upon a rod the outer end of which is a rack 38 meshing with a pinion 39 having a sliding but keyed fit upon the plunger 33. Casing 35 is provided with a pipe connection 40 opening centrally into the cylinder of air valve 36 and also into the cylinder of piston 37. Two other pipe connections, 41, 42, symmetrically disposed to each side of connection 40, open into the air valve cylinder only. A third pipe connection 43, opening into the air valve cylinder, lies at the inner end thereof.

Piston 37 is spool-shaped with an inner head 44 of greater diameter than its outer head 45; the cylinder in which this piston operates is correspondingly bored in two diameters. A pipe connection 46 opens into the larger bore just inside the cylinder head, while a passage 47 leads from a point in the smaller bore, separated from the outer end thereof by a distance just greater than the thickness of the smaller head 45, into the air valve cylinder immediately adjacent its outer end.

Fixed to the lower platform 1 below the table, with its axis in alinement with that of plunger 33, is a cylinder provided with an upwardly movable plunger 48; the upper end of this plunger is cut down to provide a square sectioned plug, the tip of which is centrally beveled, and has mounted upon it a pair of oppositely arranged centrally movable jaws 49.

A hole 50, immediately below the axis of the molds when closed, permits the plunger 48 to be raised, through and above the table whenever the same is at one of its positions of rest.

Four pipe connections open into the cylinder of plunger, viz., 51 at the bottom, 52 just above the piston when the latter is in its lowest position, 53 about midway between 51 and 52, and 53' at the top.

In alinement with the two plungers 33, 48, and just above the table, is a spindle the top of which constitutes the neck finishing head 54. This spindle is slidably supported just below the neck mold, in a mounting 55 attached to the plate 7. The lower end of the spindle has a peripheral flange 56 and a central bottom recess 57 adapted to receive the square plug of the lower plunger 48 while the jaws 49 will close upon and grip the flange 56 under the influence of spring 58 when the plunger 48 is raised sufficiently high. As with the upper plunger 33, so in the case of this lower plunger 48, the plunger may be rotated through the operation of a rack formed upon a piston rod 59 carrying a piston 60 which moves in a cylinder 61 fixed to the cylinder of the lower plunger 48, said rack being in mesh with a pinion 62 having a sliding keyed fit upon said plunger.

Piston 60 and its cylinder 61 are constructed like piston 37 and its cylinder, and pipe connections 63 and 64 are similarly arranged.

Each revoluble plate 7 is held in locked position by means of a locking pin 65 carried by a piston 66 operable in a casing 67 bolted to the table; a spring 68 tends to keep this pin pressed inwardly toward locking position. A pipe 69 from the central rotary valve 70, later to be described, enters the piston cylinder at its outer end while its inner end is pierced with an exhaust hole 71.

Figure 1:
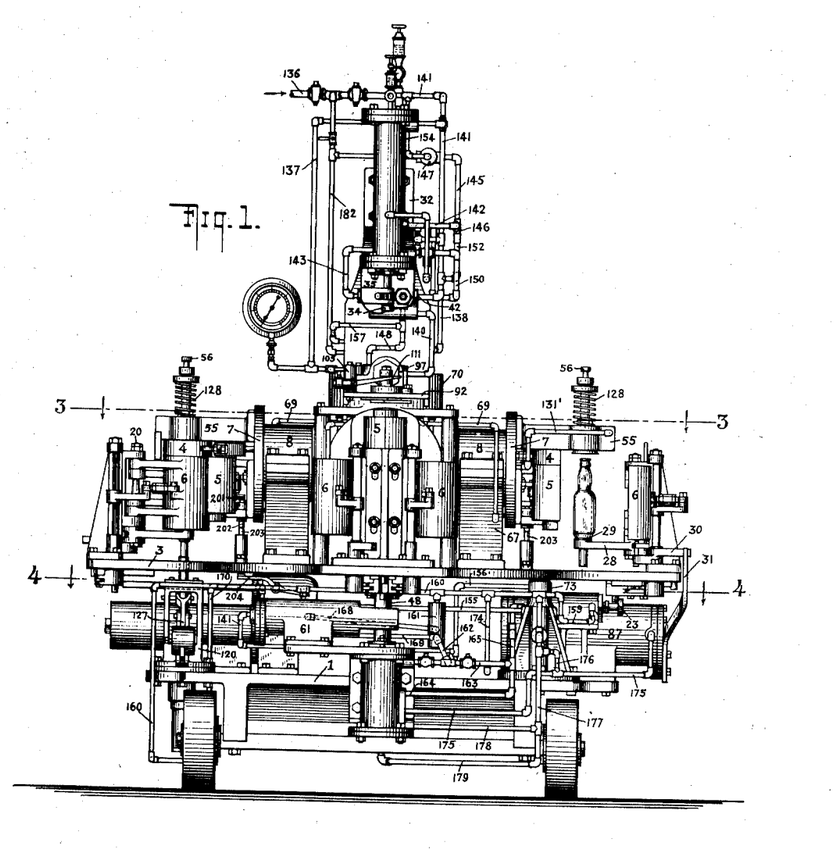
Figure 1 represents a front elevation of the complete machine.
Figure 2:
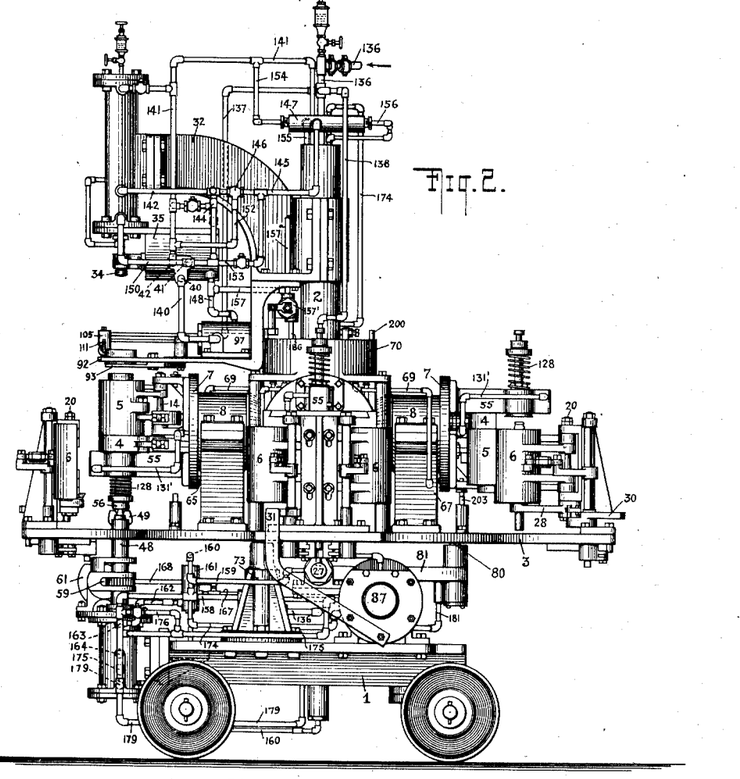
Fig. 2 represents a side elevation, taken from the right, Fig. 1.
Figure 3:
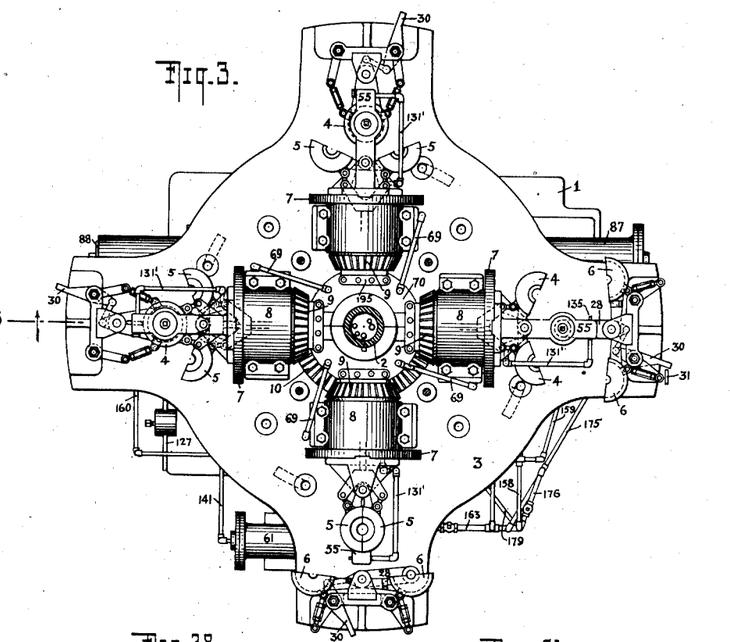
Fig. 3 represents a top plan and section, taken along the line 3—3, Fig. 1.
Figure 4:
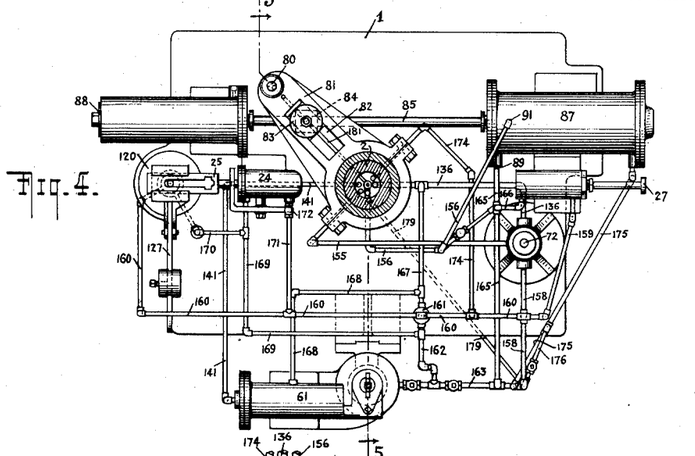
Fig. 4 represents a similar view taken along the line 4—4, Fig. 1.
Figure 44:
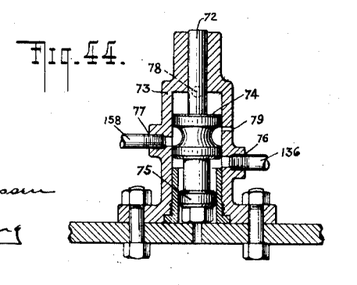
Fig. 44 represents an enlarged central vertical section, part elevation, of the table stop-pin taken along the line of the main air supply pipe, Fig. 4.
Figure 47:
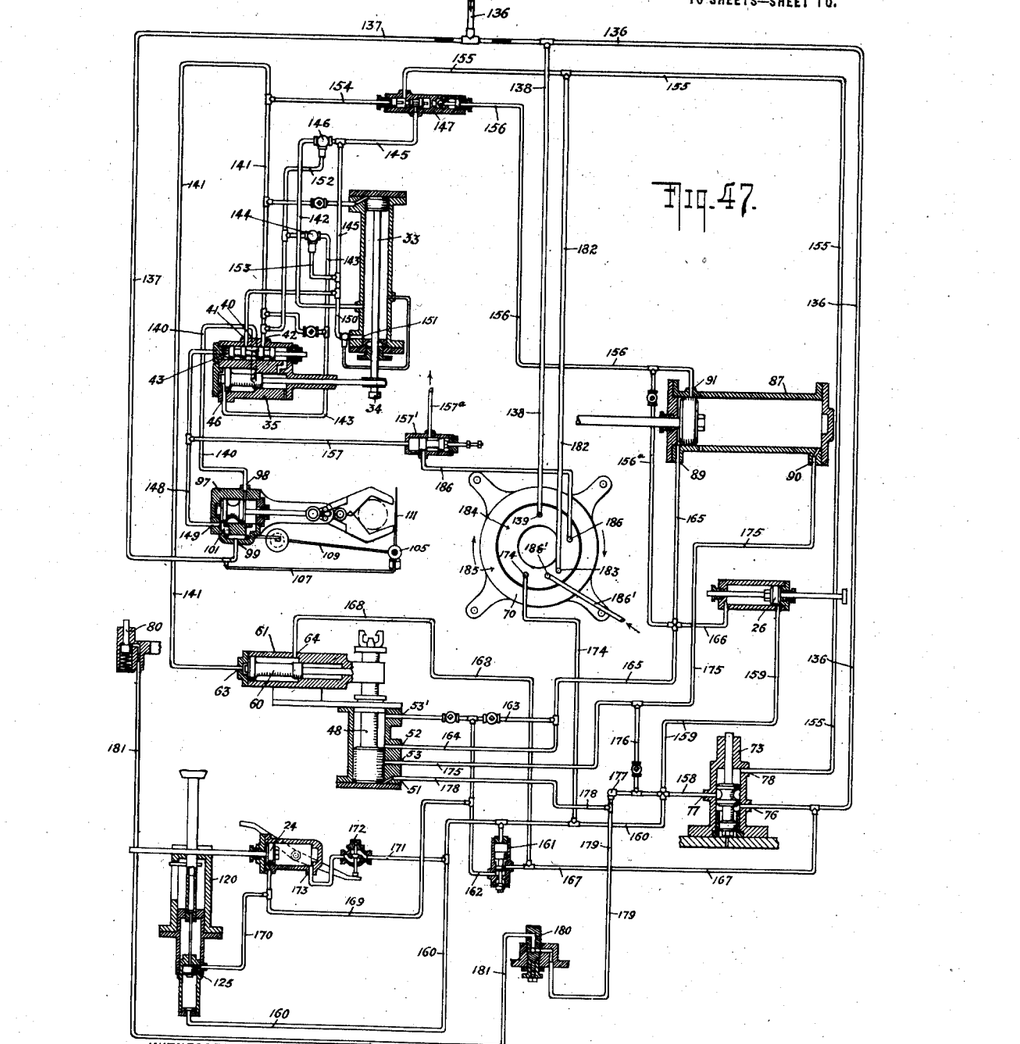
Fig. 47 is a diagrammatic view of the connections and principal operative features of the machine.

The revoluble table 3 is held in locked position by a stop pin 72 (Figs. 4, 44) vertically movable in a casing 73 bolted to the platform 1. This pin carries two pistons, 74 and 75, the former being spool-shaped and having two heads of equal diameter while the latter consists of but a single disk of smaller diameter than the heads of piston 74. Casing 73, for this double headed piston is correspondingly bored in two diameters. A pipe connection 76 opens into the casing just below piston 74 when in its lowest position, while another connection 77 opens between the two heads of pistons 74 when in the same position. A third pipe connection 78 opens into the casing just at the top of the larger bore and an exhaust 79 opens from about midway of said bore.

Figure 5:
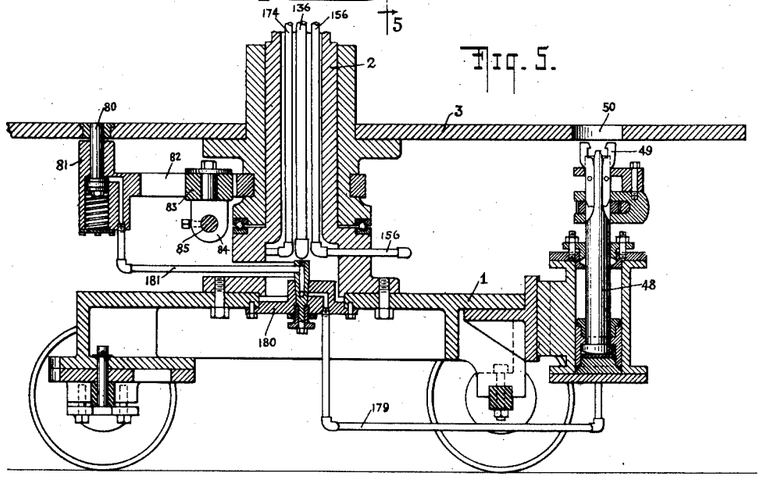
Fig. 5 represents a somewhat enlarged partial central section, part elevation, taken along the line 5—5 Fig. 4, showing the lower plunger and the table revolving means.

To revolve the table 3 so as to carry the several sets of molds from station to station there is employed a tractor pin 80 (Figs. 4, 5) vertically slidable in a casing formed at the outer end of an arm 81 whose inner end constitutes a collar which embraces the pillar 2 and is adapted to be rotated thereupon, beneath the table. Arm 81 is slotted at 82 and a block 83 slidably fitted therein; to the bottom of this block there is rotatably attached a second block 84 which is bored to constitute a collar and is keyed fast to a piston rod 85 carried by a piston 86 which latter is adapted to be reciprocated in cylinder 87. The other end of piston rod 85 carries a piston 88 which moves in an appropriate cylinder and constitutes a dash pot. Pipe connections 89, 90 and 91 open respectively into cylinder 87 at the inner and outer ends and near the inner end.

A secondary platform 92, supported from the bottom of the overhanging arm 32, carries beneath it the shears which are used to cut off the excess molten glass when the blank and neck molds are filled, as will later be described. These shears comprise two oppositely movable cutting blades 93, pivotally mounted at 94, having their inner ends connected by links to a bolt 95 which is movable to and fro in a radial slot; this bolt is fixed at the outer end of a rod carried by a piston 96 and contained in a casing 97. As the piston is moved out or in so will the shear blades be closed and opened.

A pipe connection 98 opens into the cylinder of piston 96 when the shear blades are open and is cut off when said blades are closed. Another pipe connection 99 opens into a short passage 100 the ends of which dip downwardly and then laterally to the ends of the cylinder bore as passages 101 and 102. Ball valves 103 and 104 are provided for the control of these two passages.

Mounted upon the outer end of secondary platform 92 is a small control casing 105 the upper part of which has a cylindrical bore 106 into which opens a pipe 107; the bottom of this bore is provided with a ball 108 and a passage running beneath said ball which communicates with another pipe 109. A pin, 110, extends through the casing from the lower surface of said ball and rests upon the outer end of a weighted tripping lever 111 pivoted to the casing at 112.

The other end of pipe 109 opens into a cylindrically bored casing containing a small piston 113 which has, pivoted to the upper end of its rod, a rocking lever 114. This piston is maintained normally in its uppermost position by a spring 115. The lower end of the piston bore is provided with a small exhaust opening 116.

The rocking lever, which is pivoted to casing 97 about midway of passages 101 and 102 carries two pins 117, 118, which pass up through said passages and terminate beneath said balls. These pins are of such length that normally ball 104 is elevated above the opening of passage 102 while ball 103 remains down and closes passage 101.

A funnel 119 is set in the secondary platform 92 in alinement with the mold axes when at station 1 and just above the shears previously described.

Vertically slidable in the axis of the molds, and in a mounting 120 supported from the lower platform 1, at station two, is a supporting spindle 121 which is employed to keep the mold bottom 29 always against the bottom of the bottle as the latter is being blown, as will later be described. The upper part of this spindle is provided with opposite wings 122 adapted to engage with corresponding slots cut in plate 25 from opposite sides of a longitudinal slot 123 cut in the same plate. The lower part of the spindle is bored to receive a small loosely fitted button 124 fixed to the top of a rod which terminates below in a piston 125 which operates in a cylinder 125' provided with a pipe opening at each end thereof.

A weighted balancing lever 127, pivotally supported from a bracket extension of mounting 120, has one end passing into said mounting and there provided with a pin which passes transversely through spindle 121; the lever length, the magnitude of the balancing weight, etc., are so adjusted that the spindle tends normally to be lifted to its uppermost position.

Mounting 55 is bored about half way through from its inner side to constitute a recess into which the neck finishing head 54 may be and is withdrawn when not actually in use for finishing a bottle neck; a spring 128 serves for this purpose. Opening into the mounting at one side of this recess is a passage 129 which makes a right angled turn and then runs toward the end of the mounting where it opens into the bottom of a vertical branch 130 which itself opens into a transverse passage 131 leading to a pipe 131'. The outer end of passage 129, when the neck mold is closed and the neck finishing head in actual use, opens into an annular space in the neck mold surrounding said head. A ball 132 normally cuts off communication between passages 130 and 131. A by-passage 133 between passages 129 and 131 around ball 132 is kept normally closed by a spring valve 134 adapted to be opened by pressure upon a pin 135 which projects from one side of the mounting.

*The piping system and associated devices.*

As previously stated, my improved machine is primarily operated by compressed air. The piping system employed is as follows:—A main feed pipe 136, taking air from any suitable pressure source, passes down through the hollow pillar 2 and joins stop pin casing 73 at connection 76 (Figs. 1, 2, 4, 44). Just before this pipe enters the pillar two branch pipes, 137 and 138, lead from it, the former to connection 99 of casing 97, being joined by branch pipe 107 as it is about to enter said casing and the latter to opening 139 (Figs. 21–30) of central rotary valve 70.

A pipe 140 leads from connection 98 to connection 40; another pipe, 141, from connection 42, branches to an opening at the top of cylinder of plunger 33, and passes down through pillar 2 to connection 63 of cylinder 61; a third pipe, 142, which leaves the cylinder of plunger 33 from a point near its bottom, divides into two branches, one of which, 143, passes through a check valve 144 to connection 46 at end of casing 35, while the other, 145, passes through a similar check valve 146 to the top control valve 147 (Fig. 37); another pipe 148 joins connection 43 in casing 35 (Fig. 8) to an opening 149 in passage 101 of casing 97; and another pipe 150 unites connection 41 of casing 35 to an opening 151 at the bottom of cylinder of plunger 33.

Figures 6, 7, 8, 9, 11:
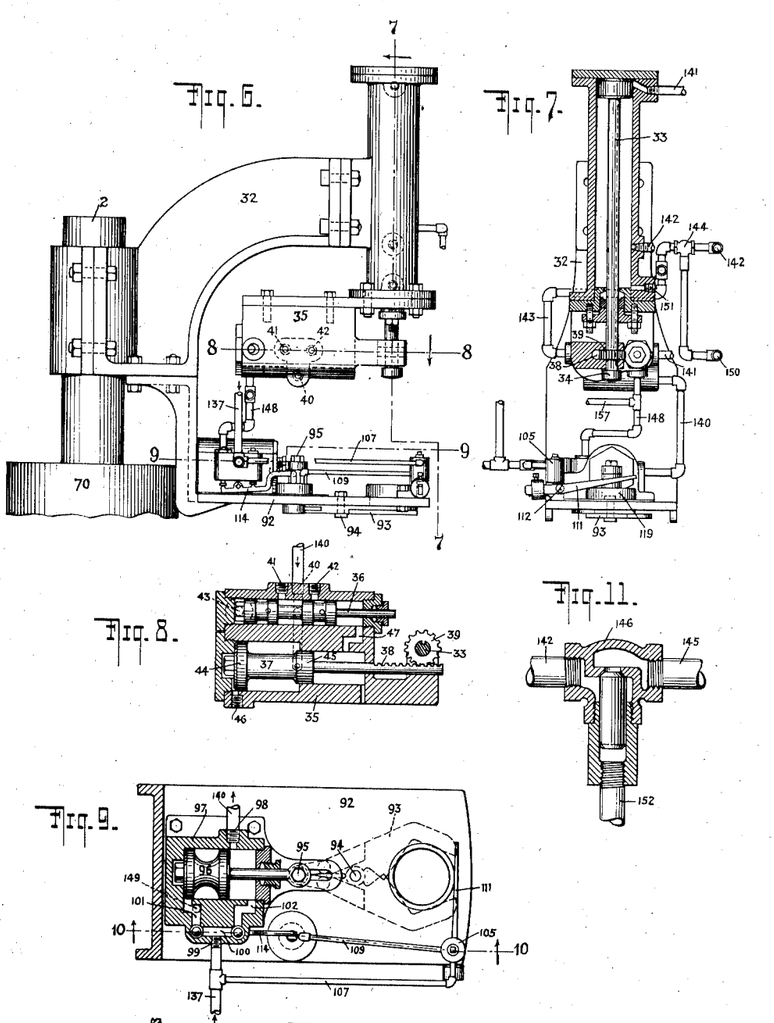
Fig. 6 represents an elevation, similarly enlarged, showing the upper plunger, the mechanism for revolving said plunger, the shears, the tripping lever, and some of the associated mechanism and air valves.
Fig. 7 represents a section, part elevation, taken along the line 7—7 of Fig. 6.
Fig. 8 represents a section, still further enlarged, taken through the mechanism for rotating the upper plunger and through a principal air valve along the line 8—8 of Fig. 6.
Fig. 9 represents a section, part plan, on the same scale as Fig. 8, taken along the line 9—9 of Fig. 6 and showing the shears, its operating mechanism, and an associated air valve.
Fig. 11 represents a central vertical section showing in detail the construction of one of the stop-valves.
Figure 10:
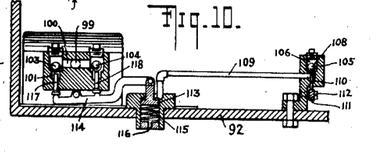
Fig. 10 represents a section taken along the line 10—10 of Fig. 9.

The construction of check valve 146, which is exactly the same as that of valve 144, is shown in Fig. 11. In the former a short pipe 152 joins the lower or check side of the valve to pipe 141 while, in the latter valve a similar pipe joins the check side of the valve to a pipe 153 which itself joins pipe 145 to connection 41 of casing 35.

Figure 37:
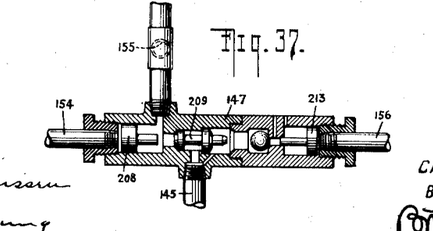
Fig. 37 represents a horizontal axial section, to the same scale as Fig. 36, through the top control valve.
Figure 38:
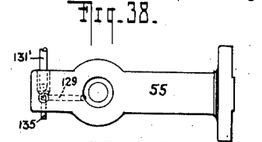
Figs. 38 and 39 represent a top plan and side elevation, respectively, of the valve and casing therefor which controls the blowing of the bottle.
Figure 39:
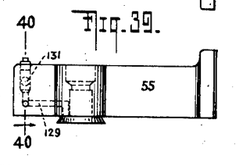
Figure 40:
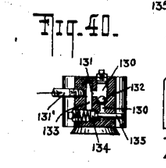
Fig. 40 represents a section through said valve and casing taken along the line 40—40 of Fig. 39.
Figure 41:
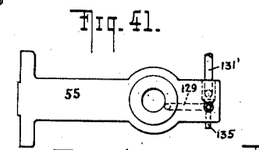
Figs. 41 and 42 similarly represent top plan and side elevation views respectively of the same valve and casing as positioned to control the vacuum in the neck mold during the filling of the neck and blank molds with the initial charge of molten glass.
Figure 42:
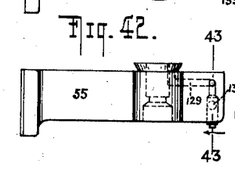
Figure 43:
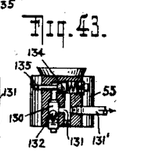
Fig. 43 represents a section through said valve and casing taken along the line 43—43 of Fig. 42.

A second branch pipe 154 leaves pipe 141, just before the latter passes into and down the pillar, and enters the left end of top control valve 147 (Fig. 37).

From an opening near the left end of valve 147, a pipe 155 leads down through pillar 2 and to top opening 78 of stop pin casing 73; the right end of valve 147 is joined, by a pipe 156 also passing through pillar 2, to connection 91 of cylinder 87.

Figure 35:
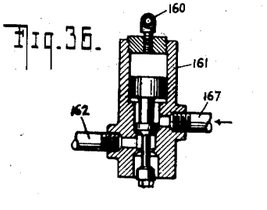

A pipe 157 branches from pipe 148 to one end of vacuum control valve 157', (Fig. 35) and a pipe 157ª, from some convenient vacuum source, opens into said valve about midway of its ends.

Opening 77 of stop pin casing 73, (Figs. 4, 44) takes a pipe 158 having branches as follows: 159 to right of cylinder of piston 26 (Fig. 20); 160 through bottom control valve 161 to bottom of cylinder of piston 125. The front end of pipe 158 turns downwardly as vertical pipe 177.

From the front of valve 161 a pipe 162 leads to pipe 163 which latter enters top opening 53' of cylinder of plunger 48. Pipe 164, entering opening 52 of the same cylinder, becomes 165 leading to opening 89 of cylinder 87; a branch 166 runs from pipe 165 to the left end of cylinder of piston 26.

From the rear of valve 161 a pipe 167 connects with pipe 136; a branch 168 leads to pipe connection 64 of cylinder 61.

A pipe 169 branches from pipe 162 and leads to the left opening of cylinder of piston 24; sub-branch 170 leads to top of cylinder of piston 125.

From pipe 160 a branch 171 leads to check valve 172 (Fig. 19) and thence to opening 173 of cylinder of piston 24.

A pipe 174 leads from pipe 160 up through hollow pillar 2 and down to central rotary valve 70.

A pipe 175 leads from opening 53 of cylinder of plunger 48 to opening 90 of cylinder 87; from pipe 175 a branch 176 leads to a vertical pipe 177 which again branches into pipe 178 going to opening 51 of cylinder of plunger 48 and into pipe 179, the latter passing to plug 180 at bottom of pillar from whence a pipe 181 leads to above the piston of tractor pin 80.

A branch pipe 182 leads from pipe 155 just outside of top control valve 147 and passes down outside the pillar 2 to opening 183 of central rotary valve 70.

Central rotary valve 70 (Figs. 1, 2, 12, 13, 21 to 30) comprises a fixed conical bushing 184 which is fixed to pillar 2, and a complementary bushing 185 surrounding the first and fixed to table 3 so as to revolve therewith. Besides pipes 174, 138 (to opening 139), and 182 (to opening 183), a vacuum pipe 186 from vacuum control valve 157', and a pipe 186' (either from the main pressure source or from some independent pressure source) enter the top of the fixed bushing; this bushing is also provided with small exhaust openings 186ª, 186ᵇ and 186ᶜ. From the bottom of the movable bushing 185, on each of the four sides thereof, four short pipes, 187, 188, 189 and 190 connect with four passages 191, 192, 193 and 194 in a fixed block 195 of vertical revolving valve 17. This fixed block is conically recessed to receive a complementary cone forming part of a revolving block 196 which constitutes the inner end of hollow drum 8.

Figure 14:
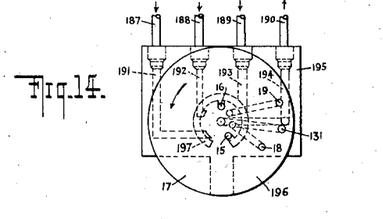
Fig. 14 represents an elevation, taken from the right, Figs. 12 and 13, and on a scale somewhat greater that that of those figures showing the vertical revolving valve which controls the air used for opening and closing the blank molds.
Figure 15:
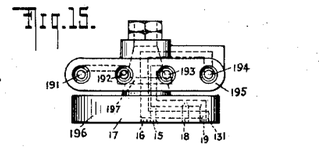
Fig. 15 represents a top plan of the valve shown in Fig. 14.

Passages 191, 192 and 194 open through the conical recess of block 195 while passage 193 opens into an incomplete annular groove 197 formed in said recess. The revolving block 196 has two passages leading from openings 15, 16 from rear of neck and blank mold cylinders to the periphery of the complementary cone so as to register, when valve 17 is in the position shown in Figs. 13, 14 and 15 with the groove 197. There are also two passages leading from openings 18, 19 (from front of neck and blank mold cylinders) to the periphery of the complementary cone which are cut off, for the same position of the valve, but will register respectively with the ends of passages 192 and 191 when block 196 has revolved through 180°. Still another passage forms a continuation of pipe 131' (from mounting 55) and passes down the axis of the complementary cone to bend and emerge at its periphery so as to register with the end of passage 194.

The fixed bushing 184 and revolving bushing 185 of rotary valve 70 are provided with axial and radial passages, and with more or less complete annular grooves for the passage of action and exhaust air in the operation of the machine as will later be described in greater detail.

A bracket attached to vacuum control valve 157' carries a pivoted bell crank lever one arm of which is forked so as to embrace, between two pair of nuts fixed thereon, a spindle to which is fixed a spool shaped piston 198 while the remaining arm 199 is adapted to be struck by one of the four pins 200 of central valve 70, as the table 3 revolves from the fourth to the first station, so as to be thrust to one side, thus shifting piston 198 from one end of its cylinder to the other and providing free communication between pipes 157' and 186 through said cylinder.

Fixed to one of the hinge members of each blank mold 5 is a wedge shaped cam 201, so arranged that, when the mold opens, it will revolve with the mold upon the axis 14 and engage the inner end of a spring retracted pin 202, fixed to the bracket supporting the axis, so as to push it outwardly against the resistance of its spring.

At the second station, where the blank mold is thus opened, as will hereafter be seen, pin 202 will thereby be caused to engage and push downwardly, against the resistance of a suitable spring, a second pin 203 which, as it moves, depresses one end of lever 204 so as to raise its other end and lift valve 205 thus opening communication between pipe 171 and the inner end of cylinder of piston 24.

*Operation of the machine.*

The operation of my improved machine is as follows:

At the first station the neck mold 4 and blank mold 5 are, considered as one, inverted and closed; the blow mold, 6, is open. Upper plunger 33 and lower plunger 48 are both up, the latter engaged with flanges 56 and recess 57 so that neck finishing head 54 is in its topmost position in the bore of mounting 55. Stop pin 72 is up, locking table 3.

Molten glass is now picked up, preferably with a punty rod, and dropped into a funnel 119 so as to fill the neck and blank molds. The glass will be firmly compacted into the neck mold by suction through passages 129, 130, 131 and pipe 131' to vertical valve 17; through axial passage to and through passage 194 and pipe 190 to central valve 70; through passages 206 and 207 in said valve to pipe 186; and thence to and through vacuum valve 157' to vacuum pipe 157ᵃ, the piston 198 of said valve having been thrown to the right so as to open the valve as the molds passed from the fourth to the first station as has already been described.

To prevent the glass being cushioned by air as it flows into the neck mold I form radial grooves upon the upper face of the neck finishing head between its central teat or indentor and its periphery.

Tripping lever 111 is now depressed, by means of the punty rod, thus causing ball 108 to be raised by pin 110 so as to permit air from pipe 137 to be admitted through pipe 107 to pipe 109. This depresses piston 113, thus rocking lever 114, dropping ball 104, so as to shut off air through passage 102, and raising ball 103. Air will now pass from pipe 137 through passage 101 and force piston 96 to the right so as to close the shear blades 93 and cut off the excess glass; simultaneously air will pass by pipe 148 between openings 149 and 43 and snap the piston of principal air valve 36 to the right.

As soon as the punty rod is raised so that tripping lever 111 can return to its normal position the shear blades will open and piston 96 return to the left. Air will now pass through passage 102 across in front of piston 96, through pipe 140, through cylinder of air valve 36, opening 42 and pipe 141, to top of cylinder of plunger 33 forcing said plunger down so as to bring bottom finishing head 34 against the molten glass in the molds and compact the same therein. As soon as the piston of plunger 33 has passed the opening of pipe 142, air rushes into this pipe, through check valve 144 and pipe 143 to connection 46 at the end of cylinder of piston 37 forcing said piston to the right and rotating bottom finishing head 34 upon the glass blank so as to smooth and finish the same. (Air from connection 42 and pipe 152 keeps check valve 146 closed during this operation).

As piston 33 is forced down, piston 60, which operates to rotate the lower plunger 48 carrying the neck finishing head, will be forced to the right by air from pipe 141 to connection 63 at the end of cylinder 61.

As soon as piston 37 has reached its right hand limit air from pipe 140 is enabled to pass through the cylinder of piston 37 and passage 47 to the right of piston of valve 36 so as to return said piston to its left end limit thus cutting off air from opening 42 and pipe 141 but turning it into pipe 150 from opening 41, opening check valve 146, and closing check valve 144 so as to cut off air through pipe 143 to piston 37. Air from pipe 140 to cylinder of piston 37 will now be able, by reason of its unequal pressure upon the two piston heads, to return said piston to the left; similarly, below the table, air will flow from main pipe 136 through pipes 167 and 168 to connection 64 of cylinder 61 and return piston 60 to its original position.

Air from pipe 150 will now enter opening 151 at the bottom of cylinder of plunger 33 and force it upward; as its piston passes the opening of pipe 142 air will again rush into this pipe, through check valve 146, and pipe 145 to top control valve 147.

Air from pipe 141, besides depressing the upper plunger and rotating the lower plunger as just described, will also flow through branch pipe 154 to the end of the top control valve 147 and throw piston 208 to the right, so as to strike double headed valve 180 plug 209 and move it far enough to pass the opening of pipe 145. Air from pipe 145 will then complete the movement of plug 209 to the right, thus shutting off any communication between pipes 145 and 156, and will also return piston 208 to the left. Air will then be able to pass freely through the valve from pipe 145 to pipe 155, down through the pillar, and to opening 78 of stop pin casing 73.

Figures 18, 19, 20:
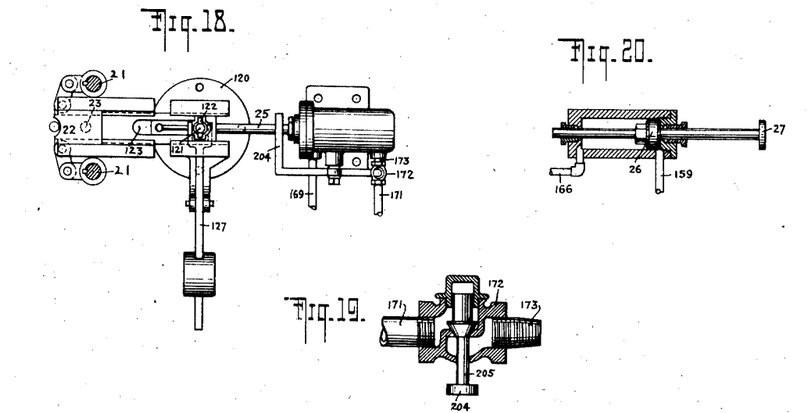
Fig. 18 represents a plan view, taken from just below the table, showing a detail of the mechanism for opening and closing the blow molds.
Fig. 19 represents a vertical section showing, in detail, the construction of another of the stop-valves.
Fig. 20 represents a horizontal axial section through the air cylinder and piston which opens the blow mold at the fourth station.
Figures 21, 22, 23, 26, 27, 28:
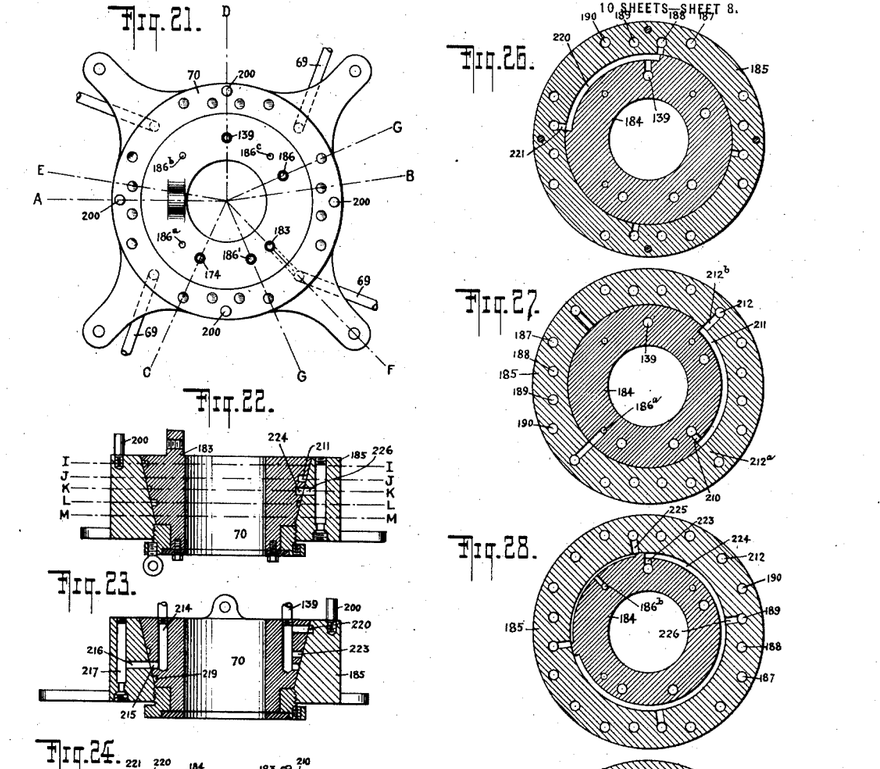
Fig. 21 represents, on a somewhat larger scale than Fig. 16, a top plan view of the central revolving valve.
Figs. 22, 23, 24 and 25 represent axial sections, through said revolving valve, taken along the lines AB, CD, EF and AG respectively of Fig. 21.
Figs. 26, 27, 28, 29 and 30 represent horizontal sections, through said revolving valve, taken along the lines I—I, J—J, K—K, L—L and M—M respectively of Fig. 22.
Figures 24, 25, 29, 30:
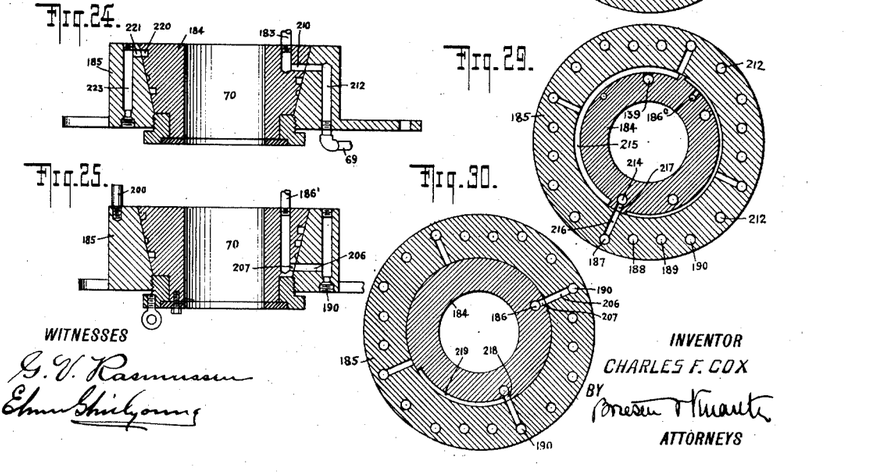
Figures 31, 32, 33, 34, 45, 46:
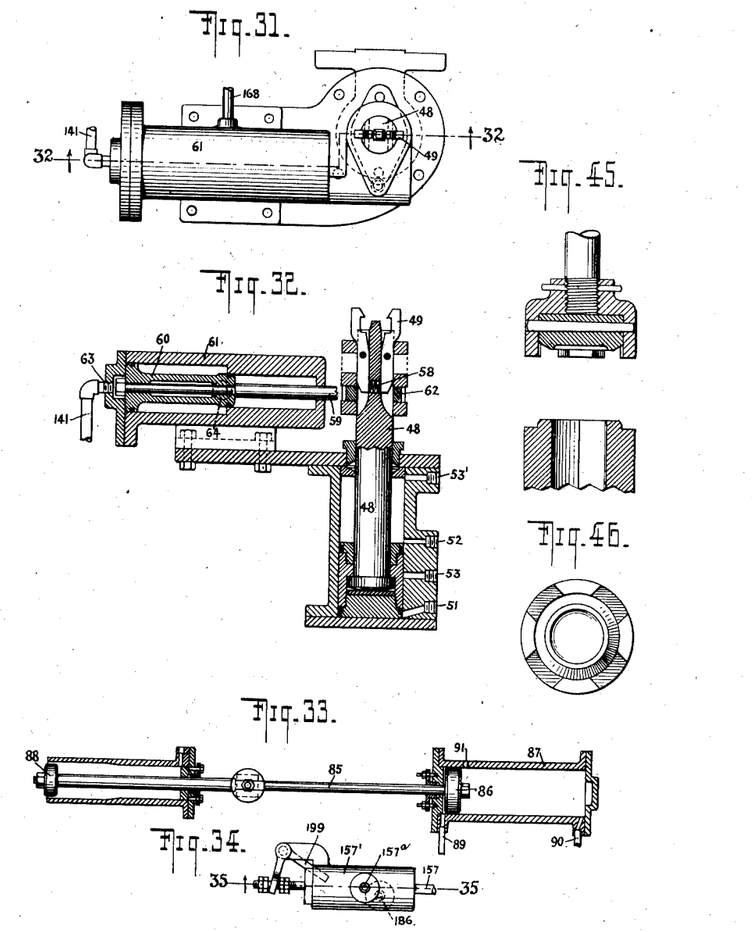
Fig. 31 represents a top plan view, taken on about the same scale as Figs. 21 to 30, of the lower plunger and the means for revolving the same.
Fig. 32 represents a sectional elevation taken along the line 32—32, Fig. 31.
Fig. 33 represents a view, part elevation and part a section through the axis, of the cylinders and pistons used for revolving the table, the scale being that of the immediately preceding figures.
Fig. 34 similarly represents a top plan view of the main vacuum controlling valve and Fig. 35 a section taken along the line 35—35 of Fig. 34.
Fig. 45 represents a central vertical section through a modified form of bottom finishing head as attached to the upper plunger, and a central vertical section of a modified form of blank mold adapted to be engaged by said modified finishing head.
Fig. 46 represents a plan view taken from below of said modified finishing head.

While the preceding operations have been going on, stop pin 72 has been up, so as to lock table 3 in position, being sustained by reason of the unequal pressure of air upon the pistons 74 and 75, as it enters between said pistons through opening 76 and main pipe 136. Air from pipe 136 has, consequently, been free to pass through the stop pin casing and opening 77 therein and to fill pipe 159 (keeping piston 26 at its left end limit), pipe 160 (keeping piston 125 at its upper limit), pipe 171 (keeping piston 24, for closing the blow mold at the second station, at its left end limit), and pipes 177, 178 and 175 (keeping piston 86 at its left end limit).

Owing to the unequal diameters of pistons 74 and 75, air entering opening 78 from pipe 155 will now depress the stop pin 72, thus cutting off the passage of air through its casing from pipe 136. This will permit cylinder 87 to exhaust through pipes 175, 176, 177, 158 and exhaust opening 79; similarly the cylinder of piston 26 will exhaust through pipes 159 and 158. The cylinder of piston 125 will exhaust, through pipe 171 to pipe 160; and the cylinder of piston 125 will exhaust through pipe 160.

Simultaneously air through pipe 169 will enter the cylinder of piston 24 and push it to the right while air through branch 170 will enter the cylinder of piston 125 so as to drag supporting spindle 121, against the pull of balancing lever 127, down below plate 25.

Air being now cut off from pipes 179 and 180, traction pin 80 will rise and engage table 3. The piston of bottom control valve 161, also, will rise so as to permit air from main pipe 136 to flow through the valve and out at pipe 162 into pipe 163 to opening 53' above plunger 48 so as to force it down.

As soon as plunger 48 reaches its bottom limit, so that it is wholly below table 3, the air entering at 53' will leave the cylinder at 52 and pass through pipes 164 and 165 to opening 89 of cylinder 87 pushing piston 86 to the right and rotating table 3. Air will also pass through branch pipe 166 to the end of cylinder of piston 26 and move said piston to the left.

Besides forcing down stop pin 72, air from pipe 155 also passes down branch pipe 182 to opening 183 of central rotary valve 70, and thence by passage 210 to groove 211 and to the two passages 212ª and 212ᵇ opening into pipes 69 belonging, respectively, to the two locking pins 65 of the first and fourth stations thus forcing back said locking pins and freeing the corresponding plates 7.

As soon as piston 86 has passed opening 91 in cylinder 87, air will pass out through pipe 156 and up through the central pillar to the end of top control valve 147 where it will push piston 213 inwardly so as to move ball 214 and hence piston 209 to the left. This will cut off the flow of air through the valve to pipe 155 so that stop pin 72 will again rise and lock the table as soon as the latter has moved through 90°.

As the filled molds move with the table from the first to the second station, the plate 7 which supports these molds will be turned through 180° by reason of the rolling of gear 9 upon gear 10; the molds will reach the second station, therefore, in upright position. Air from pipe 160, through pipe 174, up through central pillar and down to central valve 70, will now pass through passages 214, 215, 216 and 217 in said valve, through pipe 187 and passage 191 in vertical revolving valve 17 and passage from opening 19 in the revolving block 196 of said valve (block 196 has now revolved through 180° from position of Fig. 14) to the outside of piston 12 which it will force back so as to open the blank mold; this, as previously explained, will result, through wedge 201, pins 202 and 203, and lever 204, in opening valve 205.

Air from pipe 171 will now pass through valve 205 into cylinder of piston 24 which it will force to the left so as to move slide 22 outwardly and, through toggles 21, close the blow molds. Piston 125 is simultaneously pushed up by air through pipe 160 to the bottom of its cylinder so that as soon as plate 25 has been carried sufficiently far for its slots to engage the wings 122, the supporting spindle 121 will be raised through the plate by the balancing lever 127 and the mold bottom 29 consequently pushed up against the bottle blank.

As the two halves of the blow mold reach their closed position one of them will strike pin 135 of mounting 55 and open valve 134; air from pipe 186' to central valve 70 will thus pass through passages 218, filling groove 219, and 220 in said valve and out through pipe 190 to vertical valve 17; through passage 194 in said valve and the axial passage of fixed block 196 to pipe 131', and thence through passages 131, and 129 into the neck end of the bottle blank, where it will blow down into the plastic blank and cause it to fill out into the blow mold and take the form of the completed bottle. Neck finishing head 54 is, as previously pointed out, held in the bottom of the recess of mounting 55 during this and every other operation, except during the original filling of the neck mold, by spring 128, so that the air for blowing has unimpeded access to the interior of the neck.

Another pair of neck and blank molds being filled at the first station, table 3 is caused to rotate through another 90°, thus carrying the set of molds originally considered from the second to the third station. During this movement the neck and blank molds both remain closed, and the blowing pressure within the bottle, by reason of passage 220 remaining in communication with groove 219, will also remain closed until just before the molds reach the third station.

At the third station air from pipe 139 enters central valve 70, passes through passage 219, and fills groove 220, and passage 221; thence it goes through passage 223 and pipe 188 to vertical valve 17 which it traverses through passage 192 and the passage in cone leading to opening 18 in front of neck mold piston. The neck molds are, consequently, opened.

After a third set of molds is filled, the molds now at the third station are carried to the fourth station. Here they are opened by button 27 engaging with pin 23 and moving it inwardly, as piston 26 is correspondingly moved by air through stop pin case and pipe 159, after stop pin 72 has again locked the table, as already explained.

The completed bottle may now be removed.

After a filling of the fourth, and last, set of molds, the molds now at the fourth station will return to the first station. Just as they are leaving the fourth station, lever 30 is carried into engagement with fixed arm 31 and mold bottom 29 is thrown outwardly from operative to non-operative position.

Also, just after the molds have left the fourth station, air entering valve 70 from pipe 139 and filling passage 223 and groove 224, will be able to enter passage 225, and thence to go by passage 226 to pipe 189 and passage 193 of valve 17, to groove 197 of said valve, and finally to openings 15, 16, at the rear respectively of pistons 11 and 12; neck mold and blank mold will thus be closed.

Having described my invention, I claim—

1. In a bottle making machine, an inverted mold for receiving the molten glass, shears above said mold for removing the excess glass, a downwardly movable plunger provided with a bottom finishing head, means for operating said plunger, independent means for rotating said bottom finishing head, and a piston for operating said shears, said piston controlling both said plunger operating means and said head rotating means.

2. In a bottle making machine, an inverted mold for receiving the molten glass, shears above said mold for removing the excess glass, a downwardly movable plunger provided with a bottom finishing head, means for operating said plunger, independent means controlled by said plunger for rotating said bottom finishing head, and a piston for operating said shears, said piston controlling said plunger operating means.

3. In a bottle making machine, an inverted mold for receiving the molten glass, shears above said mold for removing the excess glass, a downwardly movable plunger vertically in line with said mold and shears provided with a bottom finishing head, a piston for operating said plunger, air pipes for supplying air to said plunger operating piston and a piston for operating said shears, said piston serving as a valve to regulate the supply of air to said air pipes.

4. In a bottle making machine, an inverted mold for receiving the molten glass, shears above said mold for removing the excess glass, a downwardly movable plunger provided with a bottom finishing head, a neck finishing head, means for operating said shears, and means controlled by said shear operating means for both operating said plunger and rotating said neck finishing head.

5. In a glass-working machine, the combination of a cylindrical carrier rotatable about its own axis and otherwise movable only in a horizontal plane and having a fluid-pressure chamber, a mold including two mating members at least one of which is movable relative to the other, a piston mounted in said fluid-pressure chamber, connections between said piston and the movable mold member or members, and means for turning said cylindrical carrier upon its axis to invert the mold.

6. In a glass-working machine, the combination of a pedestal, a mold carrier journaled thereon and axially fixed with reference thereto, a mold including two swinging mating members pivotally mounted upon the mold carrier upon an axis lying at an angle to the axis of the mold carrier, an actuating member reciprocably mounted within the journal portion of the mold carrier, and connections between said actuating member and the movable mold members.

In testimony whereof I have hereunto set my hand in the presence of two subscribing witnesses.

CHARLES F. COX.

Witnesses:
LILLIAN S. BELL,
ETHEL C. PLATTS.